United States Patent
Nguyen

Patent Number: 5,289,473
Date of Patent: Feb. 22, 1994

[54] METHOD FOR DETERMINING BYTE ERROR RATE

[75] Inventor: Khanh C. Nguyen, Whitehall Township, Lehigh County, Pa.

[73] Assignee: AT&T Bell Laboratories, Murray Hill, N.J.

[21] Appl. No.: 10,140

[22] Filed: Jan. 28, 1993

[51] Int. Cl.5 .................................. G06F 11/00
[52] U.S. Cl. ................................... 371/5.1
[58] Field of Search ............ 371/5.1, 5.2, 5.3, 67.1, 371/37.1, 37.2, 37.3, 37.4, 37.5, 39.1; 364/265, 266.4

[56] References Cited

U.S. PATENT DOCUMENTS

| | | | |
|---|---|---|---|
| 3,665,394 | 5/1972 | Lender et al. | 340/146.1 |
| 3,757,296 | 9/1973 | Gibson | 340/146.1 |
| 4,616,362 | 10/1986 | Schiff | 371/5 |
| 4,942,576 | 7/1990 | Busack et al. | 371/21.2 |
| 4,959,846 | 9/1990 | Apple et al. | 375/118 |
| 4,963,868 | 10/1990 | Takayama | 341/72 |
| 5,023,872 | 6/1991 | Annamalai | 371/5.1 |
| 5,155,734 | 10/1992 | Kashida et al. | 371/37.1 |
| 5,599,722 | 7/1986 | Mortimer | 371/37 |

OTHER PUBLICATIONS

"2.4 Gb/s SONET Multiplexer/Demultiplexer with Frame Detection Capability", *IEEE Journal on Selected Areas In Communications*, vol. 9, No. 5, Jun. 1991 Dennis T. Kong.

*Primary Examiner*—Robert W. Beausoliel, Jr.
*Assistant Examiner*—Joseph E. Palys
*Attorney, Agent, or Firm*—Wendy W. Koba

[57] ABSTRACT

A method is disclosed for determining the byte error rate (ByER) of a received digital signal. In particular, a local byte clock signal is generated and a complement of the received signal (or clock signal) is compared to the clock signal (or received signal). When both are the same logic value, as determined by a series of logic gates, an error is deemed to have occurred. The total number of errors N over a predetermined period of time T are then counted. The byte error rate is then determined from the relation $$\frac{N/T}{C}.$$

3 Claims, 3 Drawing Sheets

METHOD FOR DETERMINING BYTE ERROR RATE

BACKGROUND OF THE INVENTION

1. Technical Field

The present invention relates to a method of determining the error rate of a received digital signal and, more particularly, a method of determining the byte error rate (ByER) of such a signal.

2. Description of the Prior Art

In digital data communication systems, a sequence of bits (i.e., a signal comprising binary digits) originates from a transmitter and is transmitted through a communications channel to a receiver. If the communication channel were perfect, the sequence of bits received at the receiver would be identical to the transmitted data bits. However, communications channels are not perfect and, because of the presence of noise and other spurious signals, the received data may very well not be the same as the transmitted data. Accordingly, systems have been designed to detect and correct errors occurring in sequences of received data. Such systems determine if some of the bits of the received data differ from the transmitted data, and thereafter correct the error or errors.

There are many commercially available arrangements for monitoring the received bit stream and providing error correction, for one bit at a time. Indeed, many systems list as a criteria a maximum bit error rate (BER) as one specification to monitor system performance. However, as the systems evolve and the needs of the designers change, it is becoming more desirable to also monitor and correct for "byte" errors, where a "byte" is commonly defined as a string of eight bits. A need remains in the art, therefore, for a relatively simple way for monitoring the byte error rate of a digital communication system.

SUMMARY OF THE INVENTION

The need remaining in the prior art is addressed by the present invention which relates to method of determining the error rate of a received digital signal and, more particularly, to a method of determining the byte error rate (ByER) of such a signal.

In accordance with an exemplary method of the present invention, a recovered data signal is inverted and then clocked with a locally-generated standard byte clock. The output is then provided to a counter, which will increment every time the byte clock is coincident with the complement of the data signal. The ByER may then be determined by calculating the number of coincidences during a given period of time.

It is an advantage of the present invention that the ByER may be simply determined using a microprocessor, or other similar device, where the microprocessor contains the value of the standard byte rate and controls the counting process. The microprocessor can then simply determine the ByER using the following relation:

$$ByER = \frac{N/T}{C},$$

where N is defined as the total number of counts from the counter (i.e., the number of byte rate errors), T is the elapsed count time, and C is the standard byte clock frequency.

In one embodiment of the present invention, the received signal (S) may be applied to an inverter to form the complement ($\bar{S}$) of the data signal. The complement signal ($\bar{S}$) is subsequently applied as a first input to an AND gate, where the byte clock (C) is coupled to the remaining input of the AND gate. The AND gate output (E) is then applied as an input to a counter for monitoring the occurrences of coincidences. Alternatively, a series of NAND gates may be interconnected to provide the same function, where the NAND arrangement is simplied in that only a single integrated circuit is required.

Other and further embodiments and advantages of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 3:
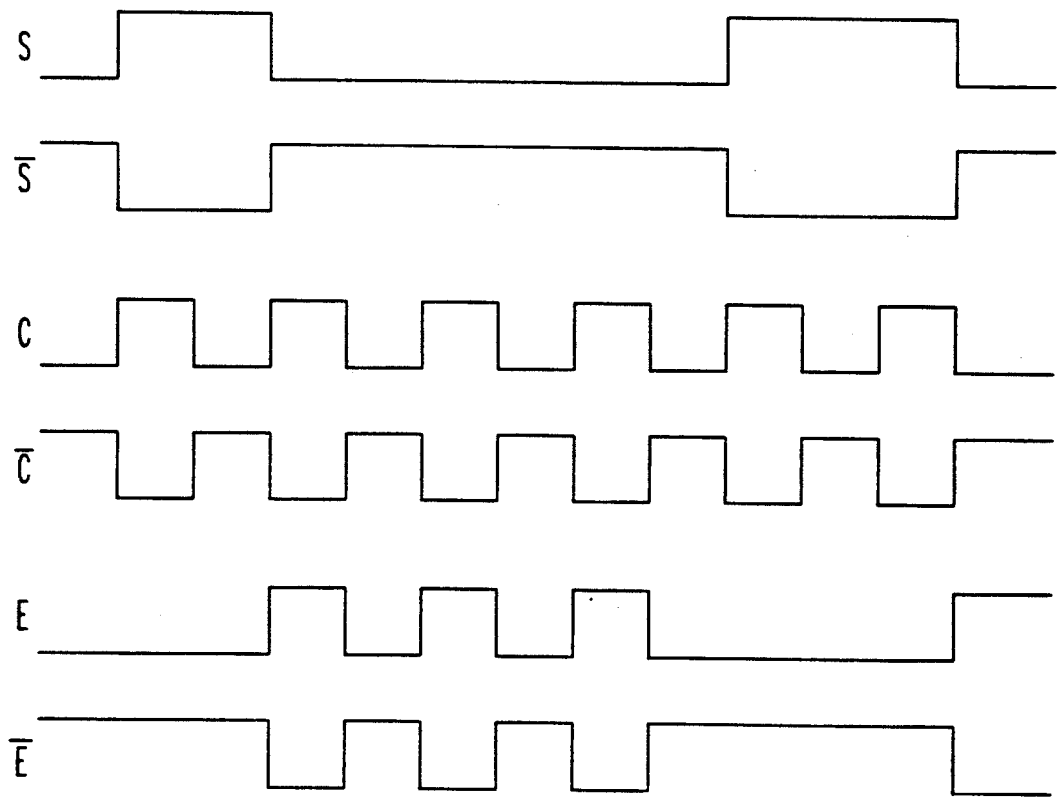
FIG. 3 contains timing diagrams of various signals generated in accordance with the teachings of the present invention.

In general, an error in the byte rate of a received digital signal will occur when the received signal S comprises a value of logic "0" at the beginning of the byte. A byte clock signal C is defined as having a value of logic "1" at the beginning of each byte and a value of logic "0" otherwise. FIG. 3 illustrates an exemplary byte clock signal C. Comparing received signal S to clock signal C, therefore, an error will be indicated when the two signals have the above-described values.

Figure 1:
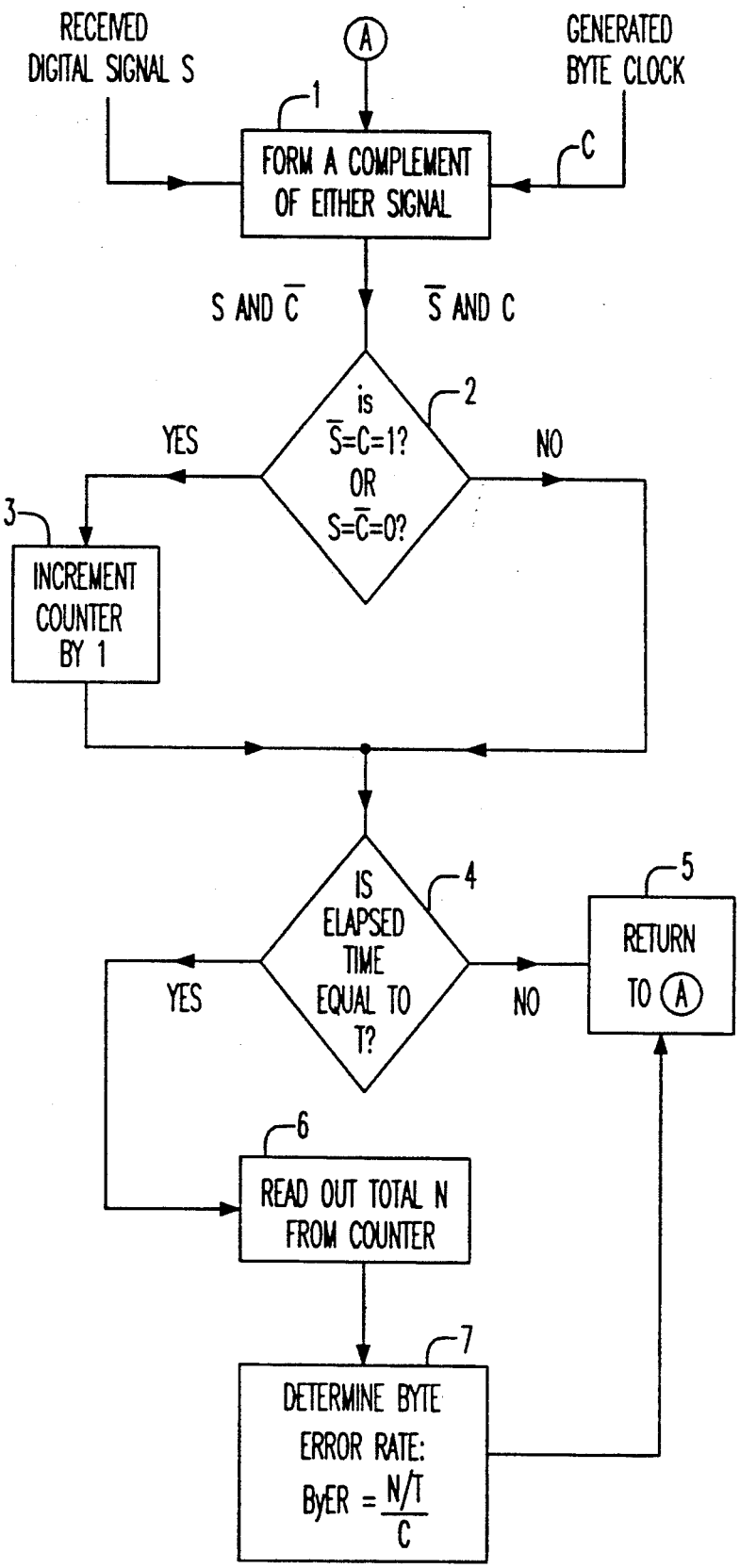
FIG. 1 contains a flowchart illustrating in particular the various steps utilized in practicing the method of the present invention.

FIG. 1 contains a flowchart illustrating an exemplary process for using the method of the present invention to determined the byte error rate (ByER) of a received digital signal. As shown, a received digital signal S and a locally-generated byte clock signal (of a predefined frequency) are applied as inputs to a rst process 1, which forms the complement of one of the two applied signals. That is, either the received signal complement $\bar{S}$, or the byte clock complement $\bar{C}$, is formed. The timing diagrams for both of these signals are illustrated in FIG. 3. Returning to FIG. 1, the complement signal, for example $\bar{S}$, and the original signal, for example, C, are then compared, as shown in decision box 2, to determine if complement received signal $\bar{S}$ and byte clock C are both logic "1" values. As discussed above, when both of these signals are logic "1", a byte rate error has occurred. It is to be understood that the signals S and $\bar{C}$ may also be utilized in decision step 2, as noted, and compared to determine if a byte error has occurred (both signals being a logic "0" value).

If the output from decisions box 2 is "yes", indicating the presence of a byte error, a counter recording the total number of such errors is incremented, as indicated by box 3 in the flowchart of FIG. 1. Alternatively, if no such error has occurred (indicated by the responsive "no" as the output from decision box 2), the counter is unaffected. The next step in the process, as indicated by decision box 4, is to determined if the predetermined elapsed time period T has been met. If the response at this point is "no", the process loops back to the initial point A and begins again. If the elapsed time period T has expired (indicated by an answer of "yes" at decision box 4), the total number of errors recorded by the counter, defined as N, is read out. Therefore, knowing the total number of errors N, the elapsed time T, and the byte clock rate C, the byte error rate may then be determined, as indicated by box 7 in FIG. 1. After the ByER has been determined the process may being again, by returning to initial point A in FIG. 1.

Figure 2:
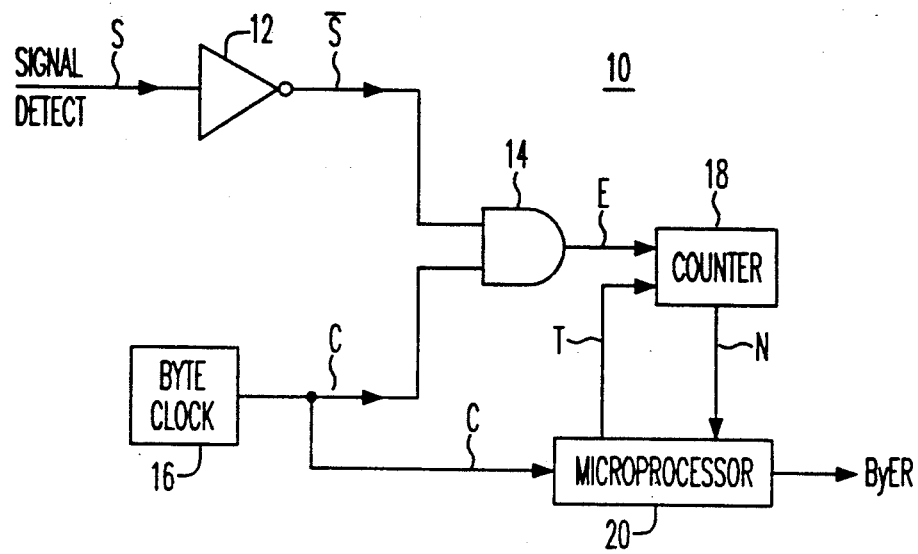
FIG. 2 illustrates an exemplary arrangement for providing byte error rate determination in accordance with the method of the present invention.

FIG. 2 illustrates an exemplary byte error rate test arrangement 10 which may be used to implement the inventive process contained in the flowchart of FIG. 1. As shown, a received data signal S (also denoted "signal detect" in FIG. 2) is applied as an input to an inverter 12. Inverter 12 functions, therefore, to form the complement, denoted $\bar{S}$ of the received data signal. Complement signal $\bar{S}$ is subsequently applied as a first input to an AND gate 14. The remaining input to AND gate 14 is a byte clock signal C, which is generated by a standard byte clock source 16. Source 16, located at the receiver, is chosen to provide a constant output at the byte rate determined by the system user. In particular, byte clock signal C will have a value of logic "1" at the beginning of each byte. The timing diagrams shown in FIG. 3 illustrate the various signals described thus far, namely, received signal S, complement signal $\bar{S}$, and byte clock signal C. The output of AND gate 14, denoted E and also illustrated in FIG. 2, will therefore have a value of logic "1" only when both signals $\bar{S}$ and C are logic "1"s. As discussed above, the coincidence of $\bar{S}$ of logic "1" with the beginning of a byte (as defined by a clock signal C of logic "1") indicates an error in byte rate of the received data signal. Thus, output error signal E from AND gate 14 will maintain an output value of logic "0" as long as there is no byte rate error present in the received data signal. However, when error signal E becomes a logic "1", a byte rate error has occurred.

In accordance with the teaching of the present invention, the byte error rate is determined by providing the error output E from AND gate 14 as an input to a counter 18. Counter 18 functions to simply increment in value each time it receives a logic "1" signal input from the output of AND gate 14 (signal E). After a predetermined period of time T has elapsed, the total number of increments N of counter 18 is read out, and used to determine the ByER as defined above. For example, if the elapsed time T was 1200 seconds and the number of errors N was 3 for a byte clock C operating at 26 MHz (26 MHz=26×10⁶ cyclespersec), the ByER will be:

$$ByER = \frac{N/T}{C} = \frac{(3/1200)}{26 \times 10^6} = 96.2 \times 1-^{-12}.$$

As shown in FIG. 2, a microprocessor 20 may be programmed to perform the calculation described above. In particular, microprocessor 20 receives as inputs to byte clock C and the total number of increments N. Microprocessor 20 may be configured to control the timing operation of the arrangement and provide the time control signal T to counter 18 such that when counter 18 receives the T signal, the total count N will be transferred to microprocessor 20. Using the relation described above, microprocessor 20 may then determine the ByER. An advantage of using a microprocessor is that the byte clock input may be modified as a function of time, at the desire of the user, without disturbing the output. Similarly, the elapsed time T may be modified by a microprocessor. In fact, the microprocessor may be configured to store progressive ByER values to enable a system designer to study the performance history of the system in terms of ByER.

Figure 4:
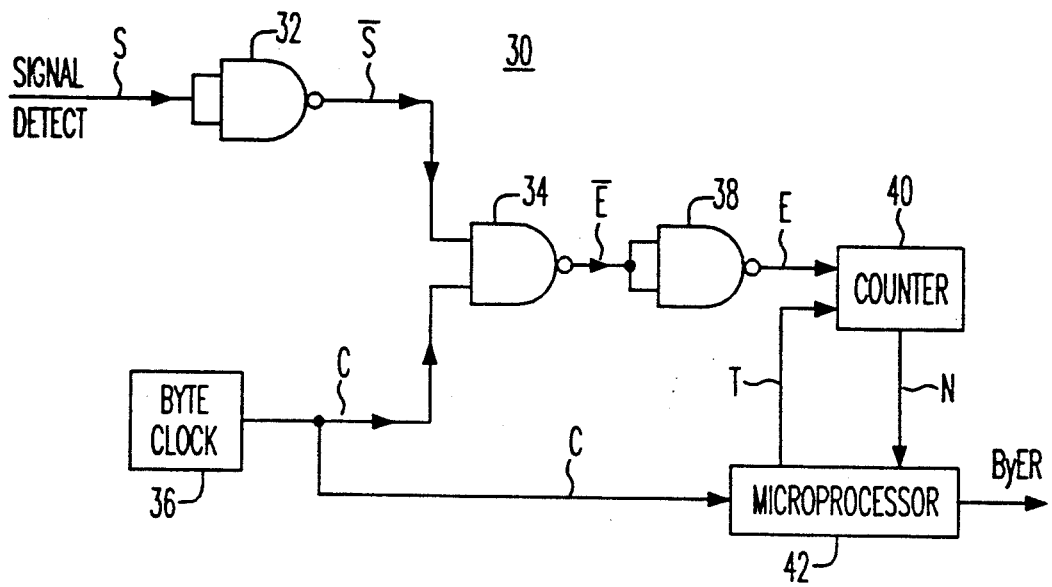
FIG. 4 illustrates an alternative embodiment for practicing the method of the present invention, utilizing a series of NAND gates.

FIG. 4 illustrates an alternative ByER detection arrangement 30. Arrangement 30, formed using a series of NAND gates, may be a preferred embodiment of the present invention, since a single integrated circuit may be used to form the complete logic arrangement. Similar to arrangement 10 described above, arrangement 30 receives as an input digital signal S detected by the receiver (not shown). Signal S is subsequently applied as both inputs to a first NAND gate 32. As is well-known in the art, when both inputs are identical, a NAND gate will function as an inverter. Therefore, first NAND gate 32 will provide as an output the complement signal $\bar{S}$ of the detected signal S. Complement signal $\bar{S}$ is subsequently applied as a first input to a second NAND gate 34. The remaining input to NAND gate 34 is the clock signal C from a byte clock source 36, which is essentially identical to byte clock source 16 described above. The output from NAND gate 34 will remain at a logic "1" value as long as either input signal $\bar{S}$ or C comprises a logic "0" value. As discussed above, when both $\bar{S}$ and C are simultaneously a logic "1" value, a byte clock error has occurred in the received signal S.

Returning to FIG. 4, when both $\bar{S}$ and C are logic "1" values, the output from NAND gate 34, denoted $\bar{E}$, will be a logic "0". A timing diagram of signal $\bar{E}$ is also shown in FIG. 3. This error output signal $\bar{E}$ from NAND gate 34 is subsequently inverted by a third NAND gate 38, which thus provides as an output the error signal E. As with arrangement 10 described above, error signal E is subsequently applied as an input to a counter 40, where counter 40 functions in a manner similar to counter 18 described above. After a predetermined period of time T, the total number N of errors may then be read out and the byte error rate determined. A microprocessor 42 may be used as described above to generate the ByER data.

Figure 5:
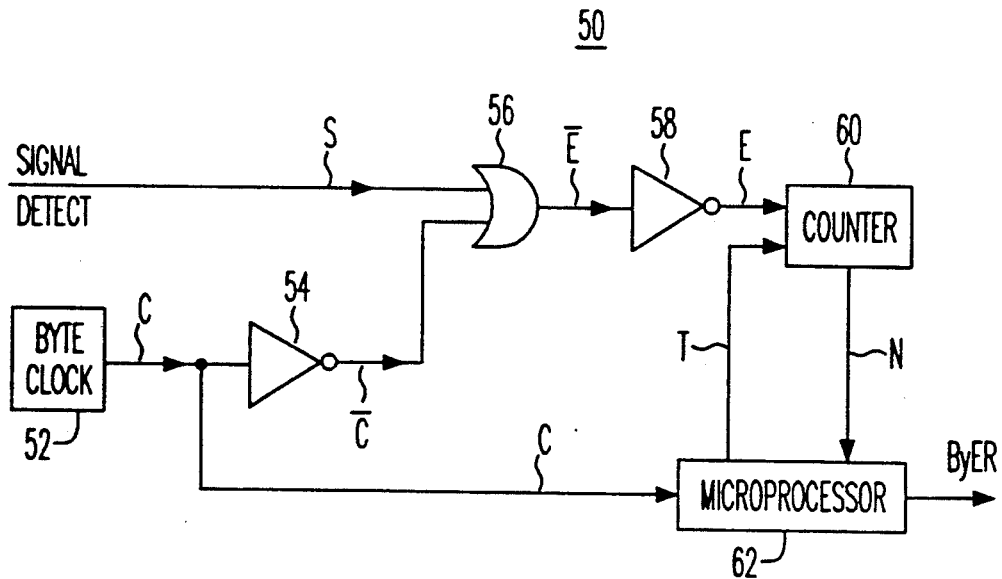
FIG. 5 illustrates yet another embodiment for practicing the method of the present invention, utilizing in particular a complement byte clock signal.

An alternative arrangement 50 for providing the same ByER determination is shown in FIG. 5. In this case, an inverted byte clock $\bar{C}$ is formed by passing the output C from a clock source 52 through an inverter 54 (the timing diagram of signal $\bar{C}$ is also illustrated in FIG. 3). Inverted clock signal $\bar{C}$ and received signal S are subsequently applied as separate inputs to an OR gate 56. As is well-known in the art, the only time an OR gate will provide an output of logic "0" is when both inputs are logic "0", which in this case is indicative of an error in the received signal S byte rate. Therefore, the output from NOR gate 56, denoted $\bar{E}$ will be at logic "0" when an error has occurred. Signal E subsequently passes through an inverter 58 such that an error signal E is formed which will be a value of logic "1" when an error is present. Signal E is then utilized as the increment input to a counter 60. As with the arrangements described above, after a predetermined period of time T, the total number of errors N is read out of counter 60 and used to determine the byte error rate (ByER).

It is to be understood that there exist many other logic arrangements which may be used to perform the method of the present invention. Further, a microprocessor is not considered to be a necessary element of the present invention and various other arrangements may be used to determine the byte error rate.

I claim:

1. A method for determining the byte error rate in a received digital signal S, the method comprising the steps of:
   a) providing a byte clock signal C at a predetermined frequency;
   b) inverting either one of the received digital signal S and byte clock signal C ($\bar{S}$ or $\bar{C}$) to form a complement signal;
   c) comparing the complement signal ($\bar{S}$ or $\bar{C}$) to the other signal (C or S) and providing an output error signal E of logic value "1" when both said complement signal and said other signal comprise the same predetermined logic value; and
   d) counting each occurrence of the logic value "1" for error signal E and for providing as an output, after a predetermined period of time T, the total number N of said occurrences; and
   e) determining the byte error rate (ByER) of said received digital signal S from the relation $$ByER = \frac{N/T}{C}.$$

2. The method as defined in claim 1 wherein
   in performing step b), the complement of the received digital signal, denoted $\bar{S}$ is formed;
   in performing step c), the complement received signal $\bar{S}$ is compared to the byte clock signal C, wherein the error signal E comprises a value of logic "1" when both said complement received signal $\bar{S}$ and byte clock signal C are logic "1" values.

3. The method as defined in claim 1 wherein
   in performing step b), the complement of the byte clock signal, denoted $\bar{C}$ is formed;
   in performing step c), the received signal S is compared to the complement byte clock signal $\bar{C}$, wherein the error signal E comprises a value of logic "1" when both said received signal S and complement clock signal $\bar{C}$ are logic "0" values.

* * * * *